C. B. STEELE.
CONVERTIBLE CAR.
APPLICATION FILED MAR. 23, 1917. RENEWED MAR. 15, 1919.
1,308,511.
Patented July 1, 1919.
2 SHEETS—SHEET 2.
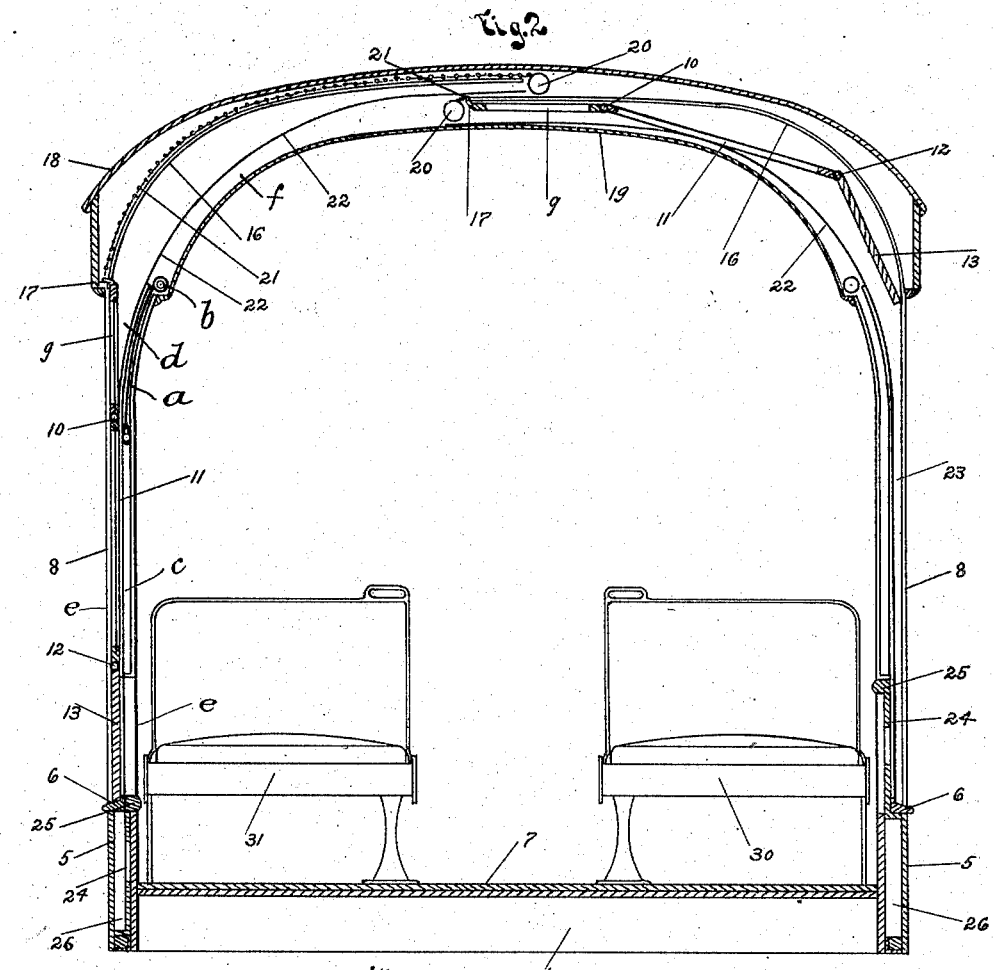
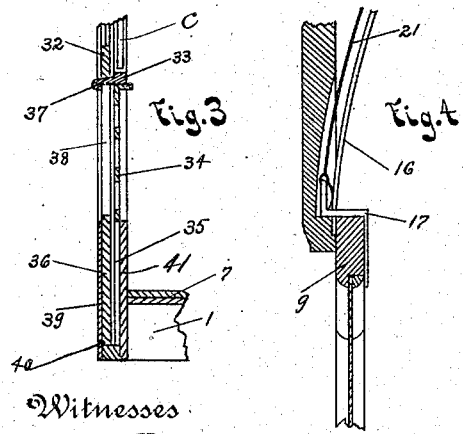
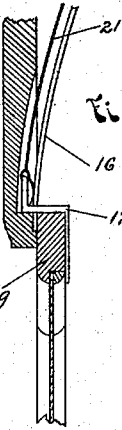
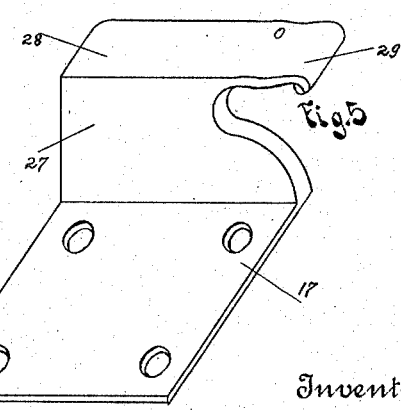

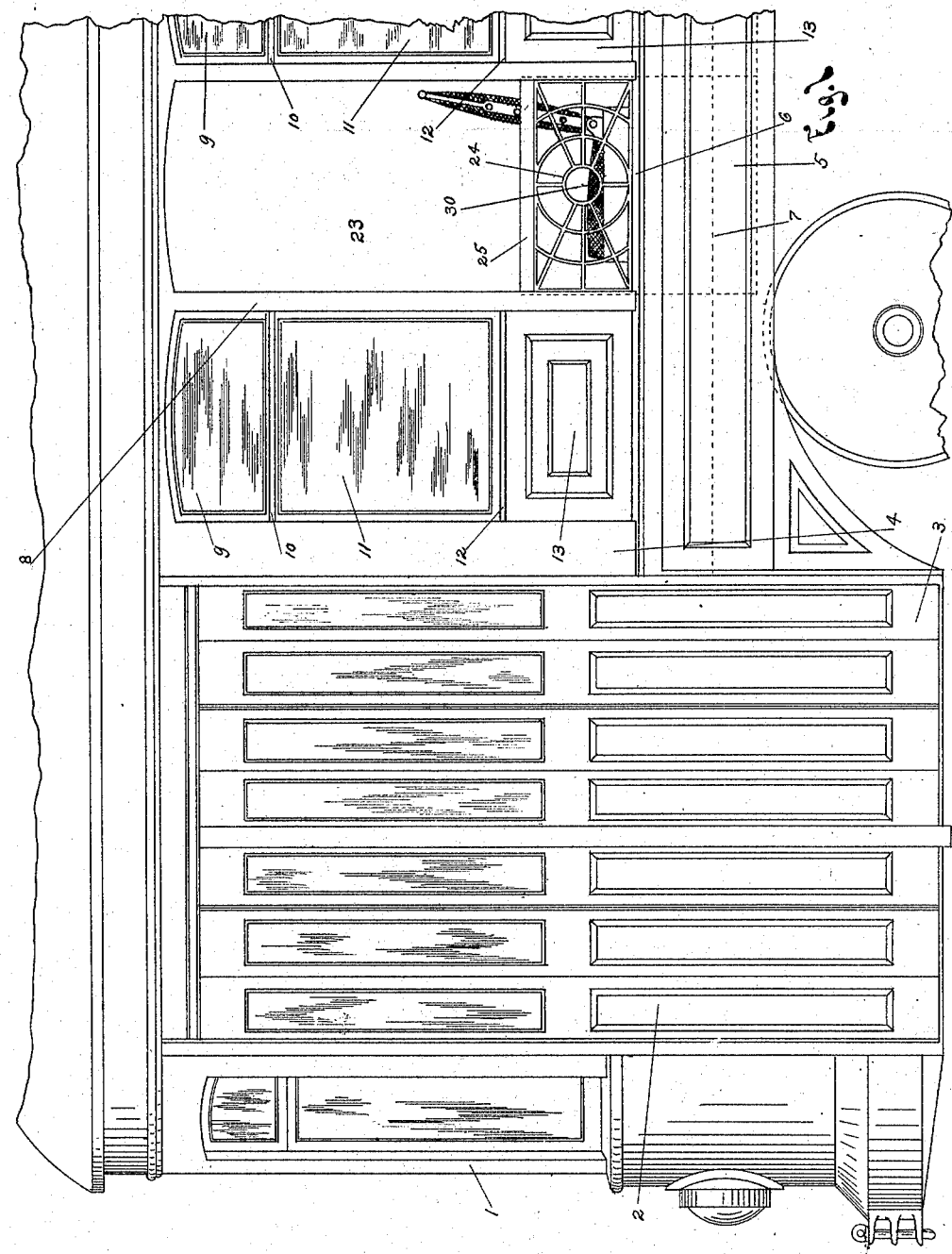

UNITED STATES PATENT OFFICE.

CHARLES BREWSTER STEELE, OF NEW YORK, N. Y.

CONVERTIBLE CAR.

1,308,511. Specification of Letters Patent. Patented July 1, 1919.

Application filed March 23, 1917, Serial No. 157,052. Renewed March 15, 1919. Serial No. 282,880½.

*To all whom it may concern:*

Be it known that I, CHARLES BREWSTER STEELE, a citizen of the United States of America, residing at New York, in the county of New York and State of New York, have invented certain new and useful Improvements in Convertible Cars, of which the following is a specification.

My invention is a fully convertible passenger car that can be instantly transformed from a completely closed car into a completely open car with the greatest ease and convenience, a single car thereby giving the service of two cars, the same car being thoroughly capable of continuous operation every day of the year, during all seasons and conditions of climate, affording passengers comfort and protection from the cold and inclement weather, and the comfort and enjoyment of a completely open car during hot or pleasant weather.

Another object of my invention is that this car can be instantly and safely converted from a completely closed car into a completely open car within a few moments, and reconverted, vice versa, by the conductor or passengers while the car is traveling at its highest rate of speed, so that should it be operating as an open car, and a sudden storm should arise, the car can be expeditiously and conveniently transformed into a closed car, and when the storm has subsided, can be instantly reconverted into an open car, without interference with regular car schedule, service and operation.

Another object of my invention is the provision of counterbalancing the weight of the window sash, so that the windows can be raised and housed within the space between the roof and ceiling, or lowered to seal the windows, with ease and facility.

Another object of my invention is the provision of solid lower sash sections that form side wall panels of the car body when the windows are in closed position, and rise and fall as part of the window sash.

Another object of my invention is the provision of ornamental movable open work barriers provided with balustrades that are raisable to a position to form arm rests and guards and shields for the lower portion of window openings, when the car is operating as an open "summer" car, not only subserving the purpose of preventing children and infirm passengers from being thrown, or falling from the car, but at the same time permitting a free passage and circulation of air.

Another object of my invention is the provision of openings of protracted elongations extending from the tops of the window frames to within a few inches of the car floor, thereby affording passengers the pleasure of a completely open car with unobstructed view, the short lower solid car walls protecting the feet, limbs, and clothing of passengers from dangerous protrusion and unpleasant exposure.

Another object of my invention is the construction of a completely open car instantly reconvertible into a completely closed storm proof car that is entirely free from the dangers and inconvenience of the heretofore well known accidents due to types of cars having running foot boards, providing side ingress and egress, and unprotected openings, all of which is hereinafter more fully described in the specification, designated in the appended claims, and illustrated in the accompanying drawings (accurately drawn to scale) in which like characters represent like parts in the different figures respectively.

Figure 1 is a side elevation of a car having a vestibuled platform entrance and exit, showing window frames extending from the carlines to within a few inches of the car floor, hingedly connected sash therein, solid panels constituting the lower portion of the window sash, one window frame in open position and protected by the movable adjustable openwork guard, disclosing a seat within the car.

Fig. 2 is a cross section of the car, showing the extensive window frame openings, the translucent and solid panel window sash in closed position in their adjoining window frames, and the movable adjustable openwork guard housed in its pocket, the sash guides within the roof and ceiling, the counterbalancing sash rollers and cables, and the curtain rollers, curtain grooves, and curtain shades, the opposite side disclosing duplicate construction, with the window sash and curtain shades housed within the roof and ceiling, the movable adjustable openwork guard raised into its protective position, and the car seats in relative position.

Fig. 3 is a fragmentary view of a cross section of a modification of a car upper framing portion, showing the window openings and window sash, the sliding solid side panel housed in its pocket beneath the window sill, and the movable adjustable openwork guard in its protective position above its housing pocket.

Fig. 4 is a fragmentary cross section of the car upper framing, showing in detail the upper portion of the window sash, flush against the sash guide, and disclosing the springed slidable guide keeper, with the counterbalance roller cable.

Fig. 5 is an isometric perspective of the slidable guide keeper, showing its body for attachment to the window sash, and raised flange provided with its springing extension arm, and hole for attachment of the counterbalancing roller cable.

The numeral, 1, represents a car provided with end vestibuled platforms having duplex ingress and egress doorways, but any suitable type, style, and construction of car may be utilized to embody, comprise, comprehend, and include my invention without departing from the broad principle and spirit involved therein, the numerals, 2, and, 3, respectively representing ingress and egress doors, and, 4, the body portion of the car.

The side walls, 5, are so constructed that the window sills, 6, are located a few inches above the level of the car floor, 7, from which sills, 6, the window frames, 8, extend to within a short distance below the roof eaves. The upper glass sash, 9, is secured by the hinged connection, 10, to the middle glass sash, 11, that in turn is secured by the hinged connection, 12, to the lower solid panel sash, 13, which sash, 13, performs the additional function of providing and constituting a solid panel portion of the side walls of the car, when the windows are in closed position, thereby completely closing and rendering the body of the car storm proof, curtains $a$, attached to the spring rollers, $b$, being complementarily movable within the curtain grooves, $c$, to shade the interior of the car from sunlight and glare. The compound glass and solid panel window sash are conducted by the guide, 16, and the spring keepers, 17, to raise into and between the roof, 18, and ceiling, 19, within the sash grooves, $d$, in the window posts, $e$, and the carlines, $f$, the window sash being counterbalanced to raise and lower with extreme ease and convenience by means of the spring roller, 20, and cable, 21, the cable, 21, being attached to the spring keeper, 17, which is fastened to the window sash, the grooved guide, 22, rendering complementary service therefor.

When the window sash are thus raised into the roof, an extra large aperture, 23, is provided, practically opening the entire body of the car, thereby affording passengers the enjoyment of an enlarged and unobstructed view, and an expansive passage and free circulation of air. Beneath and between the window sill, 6, and the car floor, 7, the lower section of the car side walls, 5, form a low solid barrier for protecting the feet, limbs, and clothing of passengers from the dangers of protrusion and the annoyance of exposure. A movable adjustable guard, 24, provided with a sill, 25, constitutes an openwork barrier to span the space left open when the window sash have been raised into position within the roof, and while thus guarding and protecting passengers from the dangers of accidentally falling or being thrown from the car, permits free passage and circulation of air through its ornamental openwork, and forms a comfortable arm rest. When the window sash are in closed position to render the car storm and weather proof, the openwork guard, 24, rests within the pocket, 26, in the car framing, where after being deposited, it remains conveniently and compactly housed during the period that the car continues closed, but when the car is again reconverted into an open car, by raising the window sash up into the roof space, the open work guard, 24, is again drawn up out of the pocket, 26, to span the lower portion of the car opening, 23, for the protection of passengers, which operations can be repeated *ad libitum*, and vice versa.

In Fig. 5 is shown the keeper, 17, provided with a shoulder, 27, which is so recessed that the arm, 28, extending approximately at right angles therefrom will reach beyond the sash line over the sash guide 16. The end of the shoulder, 28, is formed into a spring arm, 29, suitably constructed and tempered, which overlaps, bears, slides upon, and holds the window sash to and in alinement with the sash guide, 16, and a hole in the end thereof, or any other means, may be provided for attachment thereto of the counterbalancing cable, 21, which forms a flexible connection between the spring-roller, 20, and the window sash 9, 11, and 13.

The numerals, 30, and 31, represent passenger seats, located, respectively, beside an open space, 23, on one side of the car, and beside the space, 23, on the opposite side of the car that is closed to be closed by the window sash, 9, 11, and, 13, thus relatively designating the large extent of the opening, 23, and the low drop of the window sill, 25, below the level of the car seats, to within a few inches of the car floor.

In Fig. 3 is shown a modification in which the glassed window sash, 32, are lowered upon the sills, 33, preferably constructed integral with the window framing when the openwork guards, 34, are lowered into their pocket, 35, and the solid panel, 36, is raised up under the sill drip, 37, to cover and close the openings, 38, but when the car is to be reconverted into an open car, the sash, 32, are raised up into the roof space, the solid panels, 36, are lowered into their pockets, 39, and the openwork guards, 34, are raised to span and protect the openings, 38, the numeral, 40, designating the outer weather sealing walls of the pockets, 35, and, 41, the inner car walls of the pockets, in which, alternatively, the panels, 36, and the guards, 34, respectively repose.

The value and usefulness to the public, the operating railway company, and its employees, of a car that practically, conveniently, and economically combines within its own unit of constructive entirety and operation, the elements, features, and qualifications that enable it to be instantaneously and fully converted, transformed, and metamorphosed from a completely closed weather and storm proof car, into a completely open car, within a few moments, during its continuous service, and without interference with its operation, or interruption of its schedule, is unlimited. This car, also, permits the utilization of any type or method for the safe ingress and egress of passengers, and the employment of various modifications of construction of under, side, and top framing that may be desirable to conform to any general or special requirements, without departing from the broad principle, spirit, and scope of my invention, and as its elements, features, and beneficial advantages subserve the double purpose of producing, in reality, two cars in one, a railway company is enabled by its use to operate with a single equipment of cars throughout its entire system, all conforming to a single style and identity, with the resultant saving in cost of rolling stock, maintenance, and operation, and the furnishing of an ideal service during all seasons, in place of, and in contradistinction to, the heretofore double equipment comprising separate complements of winter type, and summer type, cars.

What I claim to be my invention, is:

1. A car having a roof, walls, and floor, seats above the floor, openings in the walls terminating at a point intermediate the seat-rests and floor, members filling the openings flexibly attached to one another all movable under the roof in elongated sequence.

2. A car having a roof, walls, and flooring, seats above the flooring, windows in the walls terminating at a point intermediate the seat-rests and flooring, sectional sash filling the windows, each section of the sash being flexibly attached to one another and all movable under the roof in elongated sequent subordinancy.

3. A car having a roof and flooring, seats above the flooring, uprights between the roof and flooring, protracted openings extensive from shortly below the roof to a terminating point intermediate the seat-rests and flooring between the uprights, sections flexibly joined to one another wholly filling the openings operatively movable into the roof in elongated sequent subordination to expose the openings.

4. A car having a roof, walls, and flooring, seats above the flooring, windows in the walls terminating at a point intermediate the seat-rests and flooring, sash filling the windows consisting of translucent and opaque sections flexibly attached to one another, and all movable in elongated sequent subordinancy to expose or close the windows.

5. A car having a roof, ceiling, walls, and flooring, seats above the flooring, openings in the walls terminating at a point intermediate the seat-rests and flooring, sections hinged to one another filling the openings and all movable in elongated sequent subordinancy within the roof and ceiling to completely expose the openings.

6. A car having a floor, solid walls terminating at a level shortly above the floor, openings above the solid walls, members filling the openings movable to alternatively close the openings or expose the interior of the car, barriers movably adjustable to alternatively shield the openings.

7. A car having a floor, solid walls terminating at a level shortly above the floor, openings above the solid walls, members filling the openings movable to alternatively close the openings or expose the interior of the car, barriers provided with arm rests to alternatively shield the openings.

8. A car having a roof, walls, and flooring, seats above the floor, a plurality of openings in the walls terminating at a point intermediate the seat-rests and floor, a plurality of sections including an opaque lower section filling the openings, all sections being simultaneously movable in elongated sequent subordinancy under cover of the roof to completely expose the openings, or likewise movable in alternative regression to completely close the openings.

9. A car having a roofing, flooring, and sides, window openings in the sides having excessive elongation extending from a short distance below the roof to a short distance above the flooring, sectional sash flexibly connected wholly filling the excessively elongated window openings movable into the roof in elongated sequent subordination.

10. A car having a roof, walls, and flooring, a plurality of openings in the walls, a plurality of members filling the openings provided with translucent and opaque sections hinged to one another and all movable to alternatively close and weather seal the openings or to expose the interior of the car.

11. A car having a roof, walls, and flooring, a plurality of openings in the walls, a plurality of members filling the openings provided with translucent and an opaque lower section hinged to one another and movable to alternatively weather seal the openings or to expose the interior of the car.

12. A car having a roof, walls, and flooring, a plurality of openings in the walls, members filling the openings provided with a plurality of translucent sections and an opaque lower section hinged to one another in sequent subordinancy and movable alternatively to expose the interior of the car or to close the openings.

13. A car having a roof and a floor, sides in approximate vertical rectangular plane joining the roof and floor, openings of large protracted elongation extensive in the sides from near the roof and terminating near the floor, straight plane sash wholly filling the large elongated openings in plane with the sides movable into the roof in elongated subordination to expose the openings, and means to counterbalance the weight of the sash during movement of the sash without and within the roof to expose or close the openings.

14. A car having a floor and a roof, walls positioned approximately at right angles to the floor and roof, openings in the walls, sectional sash filling the openings movable alternatively to expose the interior of the car or to weather seal the openings, and counterbalancing means to facilitate the movement of the members.

15. A car having a roof and floor, sides in approximate rectangular plane joining the roof and floor, excessively elongated openings in the sides extensive from nearly beneath the roof to termination nearly above the floor, rectilineally planed sash in plane with the sides wholly filling the excessively elongated openings and movable into the roof in sequent subordination, and means counterbalancing the weight of the sash during operative movement of the sash into and out of the roof to expose or close the openings.

16. A car having a roof, floor, and walls, window openings in the walls, sash in the window openings movable alternatively to expose or close the openings, sash guides, sash keepers attached to the sash provided with springy extensions for directing conformable movement of the sash with the sash guides.

17. A car having walls, window frame openings in the walls, counterbalanced window sash, sash guides, sash guide keepers provided with spring arms and counterbalance connections attached to the window sash filling the window frame openings movable to alternatively close the window frame openings or expose the interior of the car.

18. A car having a floor and roof, sides in rectangular plane to the floor and roof, protracted excessively elongated openings in the sides, sash having protracted excessive elongation and plane rectilinearity in plane with the sides wholly filling the openings operatively movable into the roof to expose the openings, conduits for the sash, means to guide the sash, means to retain the sash in conformity with the guide means, and means counterbalancing the weight of the sash during movement of the sash.

19. A car having a roof, walls, ceiling and floor, windows in the walls, sash filling the windows movable within the roof and ceiling to expose the windows, guides to conduct the sash, keepers provided with spring arms to retain the sash to the guides, counterbalancing means to facilitate the movement of the sash within and without the roof and ceiling to alternatively expose or close the windows.

20. A car having walls, window frame openings in the walls, pockets below the window frame openings, window sash filling the window frame openings movable to alternatively close the window frame openings or expose the interior of the car, and members movable to alternatively shield the window frame openings or rest within the pockets.

21. A car having a floor, walls above the floor, window frame openings in the walls, hingedly joined window sash provided with opaque sections in the window frame openings movable to alternatively close the window frame openings or expose the interior of the car, pockets in the walls, and adjustable guards movable to alternatively shield the window frame openings when the interior of the car is exposed, or become housed in the pockets when the window frame openings are closed.

22. A car having a floor, walls, roof, and ceiling, window openings in the walls, members filling the window openings movable alternatively within the ceiling and roof to expose or close the window openings, pockets in the walls, guards in the pockets movable alternatively to shield the window openings or rest in the pockets.

23. A car having a floor, walls, roof, and ceiling, window openings in the walls, translucent and opaque members filling the window openings movable alternatively within the roof and ceiling to expose or close the window openings, pockets in the walls, guards in the pockets movable alternatively to shield the window openings or rest in the pockets.

24. A convertible car having a body provided with walls, window openings in the walls provided with sash movably operative to expose or to seal the window openings, guards movably operative to protect the window openings when the window openings are unsealed.

25. A convertible car having a body provided with walls, window openings in the walls provided with sash movably operative to expose or to seal the window openings, barriers provided with arm rests movably operative to protect unsealed window openings.

26. A convertible car having a body provided with walls, window openings in the walls provided with sash movably operative to expose or to seal the window openings, barriers provided with arm rest sills movably operative to protect unsealed window openings.

27. A convertible car having a body provided with walls, window openings in the walls provided with sash movably operative to expose or to seal the window openings, guards to protect the window openings movably operative without and within housings.

28. A convertible car having a body provided with walls, window openings in the walls provided with sash movably operative to expose or to seal the window openings, guards provided with arm rests operatively movable without and within housings.

29. A convertible car having a body provided with walls, window openings in the walls provided with transparent and opaque sash portions movably operative to expose or to seal the window openings, guards movably operative to protect unsealed window openings.

30. A convertible car having a body provided with walls and roofing, window openings in the walls provided with sectional sash operatively movable within and without separate housings for the exposure or the sealing of the window openings, barriers movably operative without and within housings for protecting unsealed window openings.

31. A car having its roof, walls, and floor in approximate rectangular plane to one another, enlarged elongated window openings in the walls extensive in vertical length approximately five-sixths of the distance of the walls between the roof and floor, members having rectilineal shape wholly filling the window openings movable from the square of the walls into the square of the roof in elongated sequent subordination to expose the openings, and means to counterbalance the weight of the members movable into the roof.

32. A convertible car having flooring, roofing, and walls, window openings in the walls, means sealing the window openings movably operative to unseal the window openings, means exposing vision and air therethrough operatively movable in a direction away from the flooring to guard unsealed window openings and movably operative toward the flooring to unguard window openings.

33. A convertible car provided with flooring, roofing, walls, and window openings, operative means to seal the window openings, operative means to expose the window openings, means to counterbalance the means for sealing and exposing window openings, and means to protect unsealed window openings.

34. A convertible car provided with a body, a floor for the body, passenger seats located on the floor, inclosing walls having opaque sections terminating intermediate the floor and passenger seats, a roof above the inclosing walls, protracted openings in the inclosing walls extending between the roof and opaque sections of the inclosing walls, members for filling the openings movable in directions to expose or seal the openings, and barriers movable to protect the openings when the openings are unsealed.

35. A car having a roof, ceiling walls and floor, uprights extending between the floor and roof dividing the sides of the car into a plurality of openings, members filling the openings movable within the roof and ceiling to expose the interior of the car, guards movably adjustable to protect the openings.

36. A car having a roof, walls and floor that form an approximate rectangular prism, seats on the floor, openings in the walls terminating at a plane intermediate the seat-rests and the floor, posts dividing the openings into windows, carlines crowning the window posts, complementary continuous grooves in the window posts and carlines, sash provided with translucent and opaque sections in the complementary continuous grooves movable within and without the carlines to alternatively expose or close the window openings.

37. A car having a floor, walls, roof, and ceiling, window openings intermediate the floor and roof having protracted elongation, members filling the protracted window openings movable to expose or close the protracted window openings, members in the protracted window openings movable to expose or shade the interior of the car, and barriers movable to guard or unguard the protracted window openings.

38. A car having a roof, walls and floor, seats above the floor, window openings in the walls terminating at a point intermediate the seat-rests and the floor, means operatively movable to close or expose the window openings, means operatively movable to protect exposed window openings.

39. A car having flooring, sides, and roofing in rectangular plane one to another, window openings extensive of the sides approximately elongated from the roofing to the flooring, sash having rectilineal shape wholly filling the openings movable into the roofing, means to counterbalance the weight of the sash, the sash of window openings of a side of the car overlapping in the roofing the sash of window openings of an opposite side of the car to expose window openings.

40. A car having roofing and flooring sides in approximate vertical rectangularity to the roof and flooring, window openings in the sides having an extensive length of elongation approximately from the flooring to the roofing, sash having vertical straight planed surfaces wholly filling the window openings in vertical plane with the sides movable into the roof, the sash of window openings on a side of the car overlapping in the roofing the sash of window openings of an opposite side of the car to expose window openings.

41. A car having roofing and flooring, sides in approximate vertical rectangularity to the roofing and flooring, window openings in the sides having length of elongation extensive approximately from the flooring to the roofing, sash having vertical straight planed surfaces wholly filling the window openings in vertical plane with the sides movable into the roofing, the sash of window openings of each side of the car overlapping one another in the roofing to expose the window openings.

42. A car having a floor and a roof, seats on the floor, sides in approximate vertical rectangularity to the roof and floor, window openings elongated extensive of the sides from nearly beneath the roof to a point intermediate the seat-rests and floor, sash having vertical straight plane surfaces wholly filling the openings in plane with the sides movable into the roof, the sash from each side of the car overlapping and passing one another in the roof when moved into the roof to expose window openings.

43. A car having flooring and roofing in horizontal plane, seats on the flooring, sides disposed in vertical rectangularity to the flooring and roofing, window openings extensively elongated in the sides from nearly beneath the roofing to a point terminating intermediate the seat-rests and flooring, conformably elongated sash having straight plane surfaces wholly filling the window openings in vertical plane with the sides and movable in sequent subordination from vertical to horizontal around the square of the two planes into the roofing, the sash of window openings of each side of the car passing beyond the longitudinal vertical center line of the car when moved into the roof to expose window openings.

In testimony whereof I hereby affix my signature in the presence of two witnesses.

CHARLES BREWSTER STEELE.

Witnesses:
C. M. STALEY,
J. T. JOHNSON.

Copies of this patent may be obtained for five cents each, by addressing the "Commissioner of Patents, Washington, D. C."